No. 728,261. PATENTED MAY 19, 1903.
C. E. MARK.
PROCESS OF SUBJECTING MATERIALS TO THE ACTION OF AIR
OR OTHER GASES.
APPLICATION FILED NOV. 24, 1902.
NO MODEL.
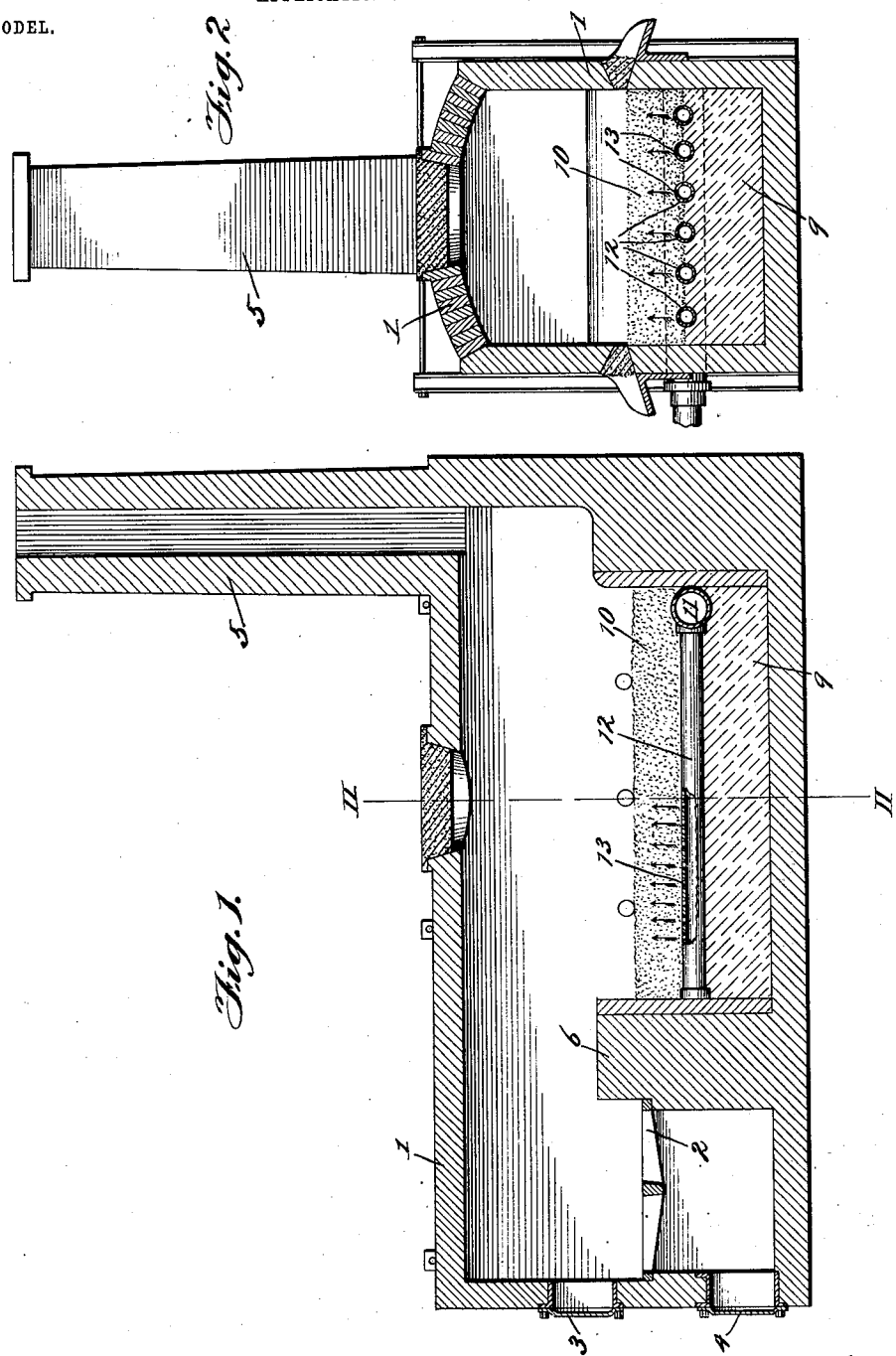

No. 728,261.  Patented May 19, 1903.

UNITED STATES PATENT OFFICE.

CHARLIE E. MARK, OF CHICAGO, ILLINOIS.

PROCESS OF SUBJECTING MATERIALS TO THE ACTION OF AIR OR OTHER GASES.

SPECIFICATION forming part of Letters Patent No. 728,261, dated May 19, 1903.

Application filed November 24, 1902. Serial No. 132,574. (No specimens.)

*To all whom it may concern:*

Be it known that I, CHARLIE E. MARK, a citizen of the United States of America, and a resident of Chicago, Cook county, Illinois, have invented a certain new and useful Improvement in Processes of Subjecting Materials to the Action of Air or other Gases, of which the following is a specification.

Broadly considered, my invention contemplates a novel process for subjecting materials to the action of gas.

More specifically considered, my invention contemplates an improved process for producing an oxidizing action on any desired materials or substances. For example, my improved process may be employed for purifying iron. Again, it may be employed for roasting gold ore. Reducing iron ore to sponge is another use to which it may be put.
It is also obvious that my improved process may be employed for chlorodizing and also for chlorinating. It can be used for oxidizing or roasting different sulfids. As another illustration it can be employed for smelting ore.

In practicing my invention for any of the above purposes I place the materials to be treated upon a bed and then force gas up through the bed and into the said materials.
The said bed may be composed of any suitable substance. For example, it may be constructed of porous fire-clay, either in the form of one large slab or in separate bricks. Again, this porous hearth may be composed of silica-sand, and for some purposes this sand can be used in a loose form, while for others it would be better to employ it in connection with a binder—such, for example, as tar or cement. In some cases the sand can be more or less fritted together in the usual and well-known manner. The porosity which is necessary for the bed may also be obtained by constructing it of gravel, ore, or other like broken granular material. It is even possible that crushed rock could be employed for this purpose. It is obvious, however, that there are various materials which may be employed, according to the specific use for which the process is to be employed, and which will give the bed the requisite amount of natural porosity. In other words, any substance may be employed which will give the bed an infinite number of indefinite openings as distinguished from a bed having definite openings or perforations, such as might be made by forming good-sized openings or perforations in fire-brick. In other words, in my improved process the passage of the gas through the bed is dependent upon the natural porosity of the latter.

For the purpose of illustration the process will be specifically described in connection with a furnace for the production of refined cast-iron, such as used for malleable castings. Such furnace is shown in the accompanying drawings, in which—

Figure 1 is a vertical longitudinal section, and Fig. 2 is a vertical transverse section on line II II of Fig. 1.

The furnace shown is in most respects similar to that now employed for the production of iron for malleable castings. It is a rectangular structure of fire-brick 1, having at one end the usual fire-grate 2 and doors 3 4 for introducing fuel and removing ashes and at the other end a stack 5. The bridge-wall 6 can be of any suitable known or approved form or construction.

The hearth of the furnace, which embodies my improvements, comprises a lower bed 9 of refractory material which is impermeable to air, such as concrete, and an upper layer 10 of porous refractory material, such as heretofore described. An air-blast main 11 extends transversely through one side wall of the furnace near its rear end and across the furnace between the layer 9 of concrete and the porous layer 10. From this main horizontal branch pipes 12 extend rearwardly beneath the porous layer 10. These branch pipes have numerous perforations 13 in their upper walls, through which the air is discharged and thence passes through the porous layer 10, as indicated by the arrows.

In employing the furnace for the production of refined cast-iron the pigs of crude iron are placed upon the hearth, the fuel in the firebox is ignited, and the products of combustion, which in the first instance contain a large percentage of unburned gases, sweep through the furnace and over the pigs. If the hearth is of a highly-porous material, a sufficient amount of air may be forced upward through it to effectively assist in producing complete combustion of the fuel-gases. The iron used for malleable castings is usually refined by the atmosphere in contact with its upper surface, the oxygen of the air serving to oxidize and remove a certain portion of the contained silicon and carbon. It is well understood by those who operate malleable-iron furnaces that the metal is of a better quality when the hearth is comparatively new and that continued use of the hearth gives a less satisfactory iron. This is due to the fact that the usual sand hearth when first put into the furnace holds in its pores a considerable amount of air, and during the first melt such air acts on the lower surface of the molten iron, thus assisting the refining action of the atmosphere in contact with the upper surface. With the porous hearth employed by me a gentle and diffused current of air may be forced up through the hearth and the layer of molten iron thereon, and any desired percentages of silicon and carbon may be removed. More satisfactory results can thus be obtained with a hearth which has been in use for a long period than with a new sand hearth which has no means for forcing air through it. The operation of refining pig-iron in this furnace is to be distinguished from Bessemerizing iron for the production of steel in that very much smaller percentages of silicon and carbon are removed. The depth of the molten iron upon the hearth is usually but from four to six inches, and the diffused current of air which is forced up through the hearth against it is generally introduced at a much lower pressure and in much smaller volume than that used in a Bessemer converter, where the body of iron is several feet deep and numerous streams of air are forced through it under a pressure of about twenty-five pounds to the inch to entirely burn out the silicon and carbon. If a hearth of sand be employed in this furnace, the particles of sand at the upper surface of the hearth become partially fused or fritted together, so as to form a crust, before sufficient heat has been applied to the metal to melt it. This crust is quite impermeable to the molten metal, but is sufficiently porous to permit air to pass through it under low pressure, although the volume of air which passes after the crust is formed is materially less than that which may be blown through to assist combustion before the crust forms.

Now, as previously stated, this process may be employed for various purposes. For example, it may be employed for producing a purifying action on melted iron, as by melting the iron on a bed of silica-sand or porous fire-clay and by then forcing air up through this bed and into the melted iron. As another instance my improved process can be employed for roasting sulfids—as, for example, by placing gold ore on a bed composed of loose silica-sand or of sand and gravel mixed together, subjecting the ore to heat, and then forcing air up through the porous bed and into the mass of gold ore. Thus in either case air admitted through the porous bed or hearth produces the desired oxidizing action on the materials supported thereon. As previously explained, however, there are various purposes for which my improved process may be employed; but in any event and regardless of the purpose for which the process is to be employed the bed or hearth must be characterized by a natural porosity, and the air or other gas must be caused to pass upward through the natural pores or minute openings of the bed or hearth. In other words and as explained, my improved process involves as a step the passage of air or other gas through a naturally-porous bed or hearth as distinguished from the forcing of air through a hearth or bed having a number of definite openings—that is to say, openings which are artificial and definite in size and location.

In the uses for which I have explained my improved process it will be readily understood that any suitable means may be employed for subjecting the metal or ore to heat and also that any suitable means may be employed for causing the air or other gas to pass upwardly through the porous bed or hearth.

It is evident that my improved process can be employed for subjecting the ore or melted metal or other substances to the action of coal-gas or other combustible gas. For example, gas of this character can be forced through the porous hearth and caused to pass through a mass of iron which is being melted. The combustible gas thus forced into the mass of melting metal will of course burn, and thus produce a more intense heat, thereby aiding in the melting action. Thus, as stated, it is evident that my improved process can be employed for subjecting the various materials to the action of various gases.

Obviously the bed or hearth must be characterized by a porosity which will render it permeable to air or gas, but impermeable to the materials supported thereon. For example, it must be impermeable to molten metal, but permeable to air or gas. Again, it must be permeable to air, but impermeable to crushed ore or finely granulated or comminuted material. The force or pressure of the air will of course depend upon the work to be done and the character of the porous bed or hearth.

As another example of the many uses for which my improved process may be employed it will be seen that brick may be burned or fired by placing them in the usual manner upon a bed or hearth of silica-sand and then burning them and at the same time forcing air up through the porous sand bed or hearth. Other similar uses are obvious.

For some purposes—such, for example, as furnace-work, where a high degree of heat is employed—the bed is essentially of a porous refractory substance. Consequently a hearth of asbestos can be employed. The asbestos can be employed either alone or it can be mixed with other materials, such as silica-sand.

What I claim as my invention is—

1. The process of producing the desired effect upon any desired materials, which consists in placing the materials in a furnace having a bed or hearth which is naturally porous, and in then heating the materials and causing a suitable gas to pass upwardly through the porous bed and into the said materials.

2. The process of subjecting any desired materials to the action of a gas, which consists in placing the materials on a bed of sand or the like, and in then causing the gas to pass upwardly through the said bed and into the said materials.

3. The process of oxidizing ore, which consists in placing the ore on a bed composed of a substance which is naturally porous, subjecting the ore to heat, and then forcing air upwardly through the bed and into the ore.

4. The process of oxidizing materials, which consists in placing the materials in a furnace having a porous bed, and in then heating the materials and forcing air upwardly through said bed and into the said materials.

5. The process of roasting ore sulfids, which consists in placing the sulfids on a porous bed of loose granular material, and then subjecting the sulfids to heat and forcing air upwardly through the bed.

6. The process of subjecting heated materials to the action of a gas, which consists in supporting the materials on a porous bed of granular material, heating the materials and forcing the gas upwardly through said bed.

7. The process of subjecting any desired materials to the action of gas, which consists in placing the materials on a bed composed of a substance which is naturally porous, subjecting the materials to heat, and then forcing gas upwardly through the pores of said bed and into the said materials.

Signed by me at Chicago, Cook county, Illinois, this 22d day of November, 1902.

CHARLIE E. MARK.

Witnesses:
ARTHUR F. DURAND,
HARRY P. BAUMGARTNER.